April 15, 1924.
W. E. WHALEN
AUTOMOTIVE VEHICLE TEST EQUIPMENT
Filed May 17, 1922
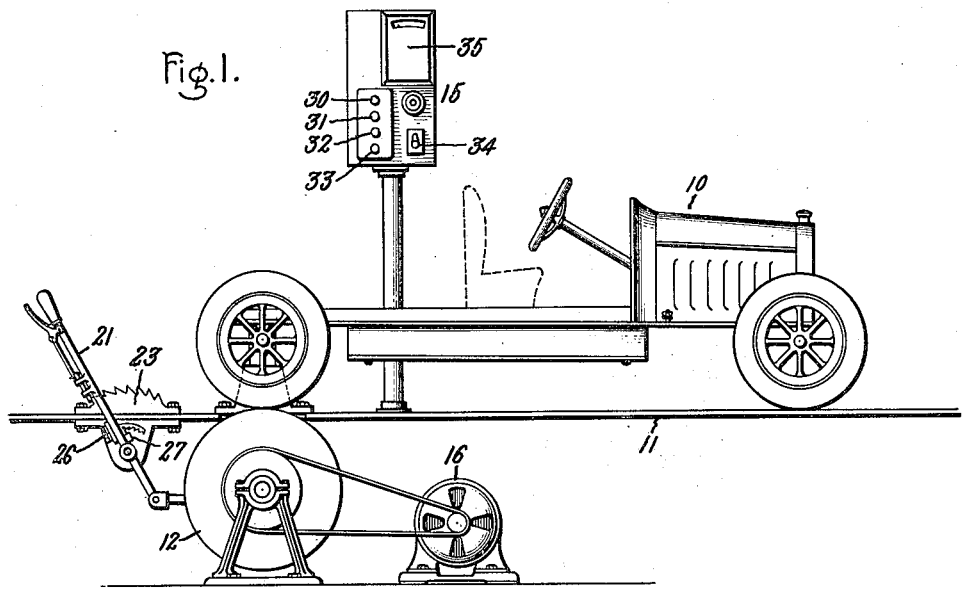
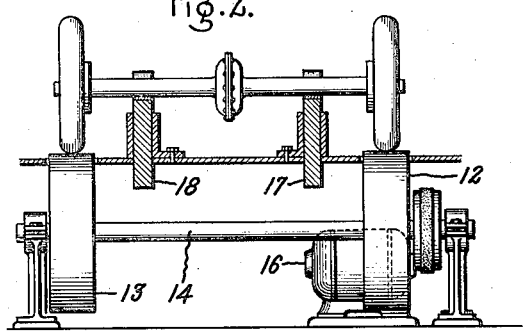
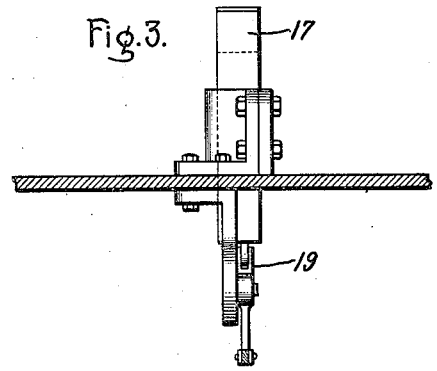
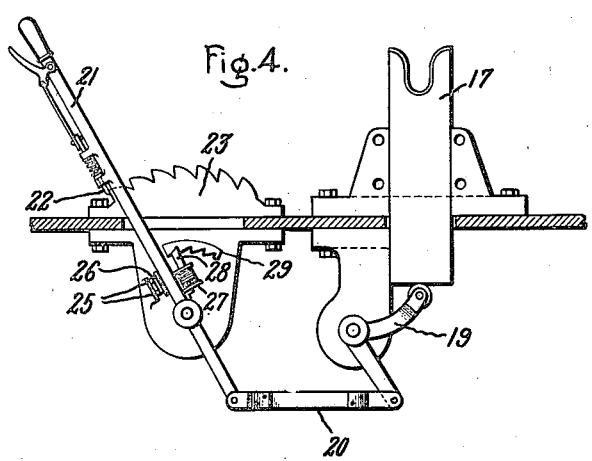
Inventor:
William E. Whalen,
by Allen S. Davis
His Attorney

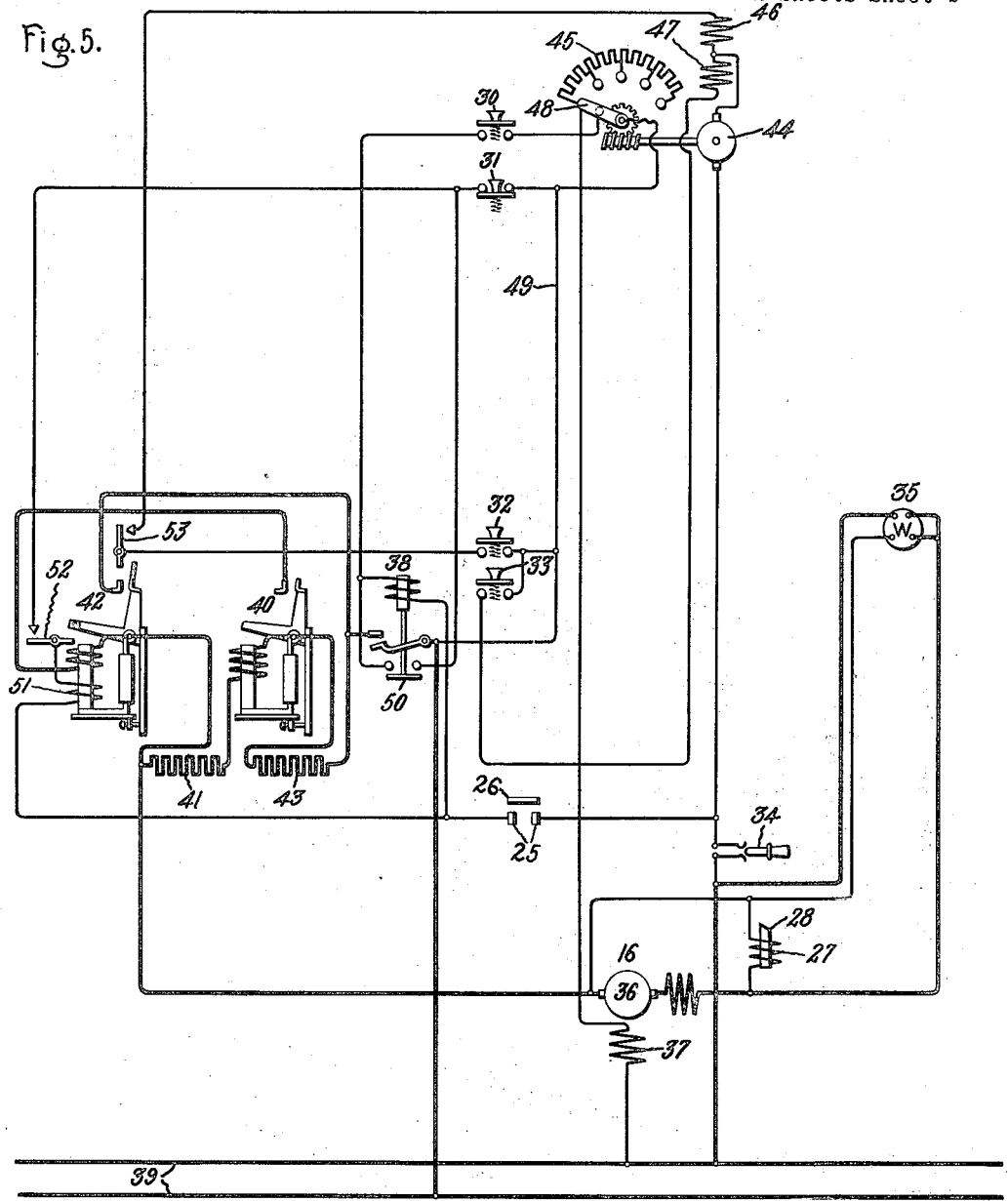

Patented Apr. 15, 1924.

1,490,442

UNITED STATES PATENT OFFICE.

WILLIAM E. WHALEN, OF NEW YORK, N. Y., ASSIGNOR TO GENERAL ELECTRIC COMPANY, A CORPORATION OF NEW YORK.

AUTOMOTIVE-VEHICLE TEST EQUIPMENT.

Application filed May 17, 1922. Serial No. 561,785.

*To all whom it may concern:*

Be it known that I, WILLIAM E. WHALEN, a citizen of the United States, residing at New York city, county of New York, State of New York, have invented certain new and useful Improvements in Automotive-Vehicle Test Equipments, of which the following is a specification.

One of the objects of the invention is to provide an improved arrangement for testing motor vehicles so as to reproduce with the vehicle in a stationary position the conditions experienced by the vehicle when under different road conditions, including hill climbing and coasting as well as ordinary running on the level.

A further object of the invention is to provide an improved arrangement whereby the power delivered by the rear wheels of the vehicle may be converted into electrical power to supplement the power supply of a factory, garage or other establishment where tests of automotive vehicles are conducted.

Another object of the invention is to provide a testing equipment comprising a test stand having a pedestal thereon adjacent the vehicle to be tested so as to be within the reach of the operator on the vehicle, the rear wheels of the vehicle resting on rotatable means so as to form a driving connection therewith and the rotatable means connected with a dynamo-electric machine, the dynamo-electric machine to be controlled by means of switch mechanism mounted on the pedestal so that the operator can control the vehicle on the test stand, and make the proper adjustments as to the speed of the vehicle motor, the power delivered by the motor, and all other adjustments which may be necessary, while seated on the vehicle.

Another object of the invention is to provide an improved arrangement for locking the vehicle to prevent a forward or reverse movement of the vehicle while under test.

A further object of the invention is to provide an arrangement whereby the locking means for the vehicle may not be released until the vehicle motor and the dynamo-electric machine connected therewith through the rotatable means have stopped, so as to thereby prevent accidents.

A still further object of the invention is to provide an arrangement whereby the dynamo-electric machine may not be connected to the source of supply until the lock for the vehicle is in proper locking relation with the vehicle.

These and other objects of the invention as will be in part evident to those skilled in the art and as will be explained fully hereinafter are obtained by the automotive vehicle testing equipment shown in the accompanying drawings which illustrate an embodiment of the invention for the purpose of explaining the principles thereof.

Referring to the drawings, Fig. 1 shows a test-stand with a vehicle locked in position thereon, ready for test; Fig. 2 shows a part sectional view of the arrangement of Fig. 1 with the rear wheels of the vehicle in position for the test; Fig. 3 is a detail of one of the locking members of the lock for the rear axle of the vehicle; Fig. 4 is a detail showing the complete arrangement of the lock for the vehicle, and Fig. 5 is a system of electrical control for the dynamo-electric machine which serves as a motor to start the vehicle motor and as a generator furnishing a load for the vehicle motor while under test.

Referring to the drawings, the motor vehicle 10 is placed upon the test stand 11 so that the rear wheels of the vehicle rest on the drums 12 and 13 which are both mounted on a shaft 14 beneath the platform of the test stand. A pedestal 15 is mounted on the test stand so as to be within easy reach of the operator of the vehicle. This test stand is provided with switch mechanism for controlling the dynamo-electric machine 16 which is operatively connected with the drums 12 and 13, and the pedestal also carries a power indicating device for the purpose of enabling the operator to determine the amount of power delivered by the vehicle motor or the amount of power taken by the driving connection and the motor of the vehicle when running light during the "lapping in" period of the driving connections and motor of the vehicle.

The locking arrangement for the vehicle to prevent forward or reverse movement of the vehicle while under test, comprises the locking members 17 and 18, mounted in the platform of the test stand so as to be movable vertically so that the rear axle of the vehicle is engaged by the upper notched ends of the members 17 and 18. The slots in the upper ends of these locking members are arranged so that the rear axle of the vehicle will be accurately aligned with respect to the drums 12 and 13 and the rear axle of the vehicle will be prevented from a forward or reverse movement but will be capable of an upward movement so as to accommodate for irregularities in the tires in the rear wheels of the vehicle. Each of the locking members is moved vertically by means of a bell crank 19 having a roller on the end of one of the arms thereof and the end of the other arm connected by means of a link 20 with an operating lever 21. This operating lever is provided with a manually operated spring catch 22 which cooperates with the teeth of a toothed sector 23 so as to hold the locking members 17 and 18 in their proper positions in locking relation with the rear axle of the vehicle.

A pair of contacts 25 are adapted to be bridged by means of a contact 26 carried by the lever 21 when this lever is in the proper locking position. These contacts control the dynamo-electric machine 16 so as to prevent the connection of the machine to a source of supply until the rear axle lock is in place. Cooperating with this lever 21 is an arrangement for preventing the releasing of the rear axle lock until the dynamo-electric machine and the motor of the vehicle are stopped. This arrangement comprises an electromagnet 27 having a winding connected in the control circuit of the dynamo-electric machine and a plunger 28 which cooperates with a toothed sector 29 when the magnet winding is energized to prevent the release of a rear axle lock for the purpose specified.

The pedestal 15 is provided with a start push button 30, a stop push button 31, a "fast" push button 32 and a "slow" push button 33, which control switch mechanism in the control circuits of the dynamo-electric machine 16. The pedestal is also provided with switch contacts which are adapted to be closed by means of the plug contact 34 which must be inserted before the equipment can be started. The operator will carry this plug when the test stand is not being used so as to thereby prevent the energization of the dynamo-electric machine 16 except under authorized conditions. The pedestal also carries a power indicating device 35 from which the operator may read the amount of power either delivered by the dynamo-electric machine 16 when operating as a generator or the power taken by this machine when operating as a motor. The readings from this power indicating device may also be used to give an approximately correct basis for the calculation of the efficiency of the driving connections and motor of the vehicle.

By referring to Fig. 5, it will be seen that I have shown the dynamo-electric machine 16 as of the direct current type having an armature 36 and a shunt field 37, although the invention is not necessarily limited to this particular type of machine. This machine is arranged to be started by means of the push button 30, stopped by the push button 31, the speed increased by the push button 32 and the speed decreased by means of the push button 33, previously referred to in connection with the explanation of the pedestal 15 shown in Fig. 1. The electromagnetic line contactor 38 is arranged to connect the armature of the machine to the source of supply 39. The electromagnetic switch or contactor 40 of the well known series lock-out type is provided for short circuiting the accelerating resistor 41 and including the series winding of the series lock-out type contactor 42 in the motor armature circuit. The contactor 42 is provided for short circuiting the accelerating resistor 43 so as to thereby connect the motor armature directly to the supply circuit.

The pilot motor 44 is provided for operating the field rheostat 45 arranged to be included in the circuit of the shunt field 37 of the main dynamo-electric machine. This pilot motor is of the well known split field type having one section 46 for operation of the pilot motor so as to increase the value of the resistor 45 in the shunt field 37 and another section 47 for the purpose of decreasing the amount of the resistor 45 included in the shunt field 37.

The winding of the electromagnet 27 is arranged to be connected across the armature 36 of the dynamo-electric machine so as to be energized while this machine is in operation so as to prevent the release of the rear axle lock of the vehicle until the vehicle motor and the dynamo-electric machine have stopped.

As thus constructed and arranged the operation of my invention is as follows: The operator will cause the vehicle 10 to be placed in the proper position on the test stand and then apply the rear axle lock by moving the lever 21 to the proper position. The contacts 25 will thereby be bridged by the contact 26 and the dynamo-electric machine 16 may be started after the operator has placed the plug 34 in its proper receptacle in the pedestal 15. By pressing on the starting push button 30, the line contactor 38 will be energized to close through a circuit including the plug connector 34, contacts 25, winding of the contactor, the start push button 30, contact member 48 of the pilot motor operated rheostat, through the conductor 49 to the other conductor of the supply circuit. When this line contactor closes it makes a maintaining circuit for itself through the contacts of the stop push button 31 and the auxiliary switch 50 associated with the line contactor, so that the start push button 30 may be released. The motor armature 36 will be energized through a circuit including the series coil of the indicating watt meter 35, the commutating field of the machine, armature 36, resistor 41, series coil of contactor 40, resistor 43, through the main contacts of line contactor 38 to the other supply conductor. When the current taken by the machine, now operating as a motor driving the power transmission elements and the motor of the vehicle, drops to a predetermined value, the series contactor 40 will close thereby connecting the series coil of the contactor 42 in circuit and short circuiting the accelerating resistor 41. When the current taken by the motor again drops to the predetermined value, the contactor 42 will close thereby short circuiting the series coil of the contactor 40 and the accelerating resistor 43, thereby connecting the armature 36 directly to the supply circuit. When the contactor 42 closes it energizes the shunt winding 51 by the closing of the auxiliary switch 52 so as to hold this contactor closed. It will be observed that when the contactor 40 opens the circuit through the series coil of the contactor 42 is also opened. Associated with this contactor 42 is another auxiliary switch 53 which is closed when the contactor closes. This auxiliary switch 53 prevents the energization of the split field section 46 of the pilot motor to increase the speed of the main machine 16 until the machine has been fully started as a motor. In order to increase the speed of the machine 16, the push button 32 will be depressed thereby energizing the pilot motor through a circuit including the plug connector 34, the armature 44 of the pilot motor, split field section 46, auxiliary switch 53, push button 32, to the other supply conductor. The pilot motor will operate to rotate the contact member 48 clockwise so as to thereby include the desired amount of the resistor 45 in the circuit of the shunt field 37 of the main machine. The power transmission elements and the motor of the vehicle under test may be "lapped in" at any speed desired within the operating range of speeds of the machine 16.

If the operator now desires to run the motor of the vehicle under power to thereby produce the effect of driving the vehicle, the ignition circuit of the vehicle will be closed and when a certain speed of the vehicle has been reached, the power indicating watt meter 35 will show that the dynamo-electric machine 16 is now operating as a generator delivering energy to the supply circuit 39. The load on the motor of the vehicle is regulated by properly controlling the fast and slow push buttons 32 and 33 respectively so as to thereby vary the amount of the resistor 45 and the circuit of the shunt field 37 of the dynamo-electric machine 16.

Because of the fact that the winding 37 of the locking device is energized in a shunt circuit to the armature 36 of the machine, the lock for the rear axle of the vehicle cannot be released until the motor of the vehicle and the machine 16 have been practically stopped, thereby avoiding accidents by requiring that the parts be at rest before the lock can be released.

In accordance with the provisions of the patent statutes, I have described the principle of operation of my invention, together with the apparatus which I now consider to represent the best embodiment thereof; but I desire to have it understood that the apparatus shown is only illustrative, and that the invention may be carried out by other means.

What I claim as new and desire to secure by Letters Patent of the United States, is,—

1. An automotive vehicle testing equipment comprising a test stand having a pedestal thereon adjacent the vehicle to be tested, a pair of traction drums mounted beneath the surface of the test stand upon which the rear wheels of the vehicle rest so as to form a driving connection therewith, a dynamo-electric machine connected to the said drums, manually operated switch mechanism on the said pedestal for controlling the said machine, and a lock mounted on the test stand between the said drums and movable vertically into locking relation with the rear axle of the vehicle.

2. An automotive vehicle testing equipment comprising a test stand having a pedestal thereon adjacent the vehicle to be tested, a pair of traction drums mounted beneath the surface of the test stand upon which the rear wheels of the vehicle rest so as to drive the drums, a dynamo-electric machine connected to the said drums, manually operated switch mechanism on the said pedestal for controlling the said machine, a lock mounted on the test stand, and a lever on the test stand connected with the said lock for moving the lock into locking relation with the axle of the vehicle.

3. An automotive vehicle testing equipment comprising rotatable means upon which the rear wheels of the vehicle rest so as to form a driving connection therewith, a dynamo-electric machine connected to the said means, manually operated switch mechanism for controlling the said machine, means for locking the vehicle to prevent a movement of the vehicle while under test, and an electrical connection controlled by the said locking means to prevent the connection of the said dynamo-electric machine to a source of supply until the said lock is in locking relation with the vehicle.

4. An automotive vehicle testing equipment comprising rotatable means upon which the rear wheels of the vehicle rest so as to form a driving connection therewith, a dynamo-electric machine connected to the said means, manually operated switch mechanism for controlling the said machine, means for locking the vehicle to prevent a movement of the vehicle while under test, and means for preventing the releasing of the said locking means while the vehicle motor and the said machine are in operation.

5. An automotive vehicle testing equipment comprising rotatable means upon which the rear wheels of the vehicle rest so as to form a driving connection therewith, a dynamo-electric machine connected to the said means, manually operated switch mechanism for controlling the said machine, means for locking the vehicle to prevent a movement of the vehicle while under test, an electrical connection controlled by the said locking means to prevent the connection of the said machine to a source of supply until the said lock is in locking relation with the vehicle, and means for preventing the releasing of the said locking means while the vehicle motor and the said machine are in operation.

6. An automotive vehicle testing equipment comprising a test stand having a pedestal thereon adjacent the vehicle to be tested so as to be within the reach of the operator on the vehicle, a pair of traction drums mounted beneath the surface of the test stand upon which the rear wheels of the vehicle rest so as to form a driving connection therewith, a dynamo-electric machine connected to the said drums, manually operated switch mechanism on the said pedestal for controlling the said machine, a lock mounted on the test stand between the said drums and movable vertically into locking relation with the rear axle of the vehicle, an electrical connection controlled by the said lock for preventing the connection of the said machine to a source of supply until the lock is in locking relation with the vehicle, and means for preventing releasing the said lock while the vehicle motor and the said machine are in operation.

In witness whereof, I have hereunto set my hand this sixth day of May, 1922.

WILLIAM E. WHALEN.